(12) United States Patent
Garcia Castro et al.

(10) Patent No.: US 12,454,657 B2
(45) Date of Patent: Oct. 28, 2025

(54) VISCOSITY INDEX IMPROVER FOR LUBRICANTS BASED ON POLYISOBUTYLENEPHENYL ACRYLATE COMB COPOLYMERS

(71) Applicant: BASF SE, Ludwigshafen am Rhein (DE)

(72) Inventors: Ivette Garcia Castro, Ludwigshafen am Rhein (DE); Rene Koschabek, Ludwigshafen am Rhein (DE); Andrea Misske, Ludwigshafen am Rhein (DE); Christoph Fleckenstein, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 18/715,771

(22) PCT Filed: Nov. 29, 2022

(86) PCT No.: PCT/EP2022/083600
§ 371 (c)(1),
(2) Date: Jun. 3, 2024

(87) PCT Pub. No.: WO2023/104584
PCT Pub. Date: Jun. 15, 2023

(65) Prior Publication Data
US 2025/0109351 A1    Apr. 3, 2025

(30) Foreign Application Priority Data

Dec. 6, 2021  (EP) .................................. 21212540

(51) Int. Cl.
*C10M 145/14* (2006.01)
*C08F 220/18* (2006.01)
*C10N 30/02* (2006.01)

(52) U.S. Cl.
CPC ......... *C10M 145/14* (2013.01); *C08F 220/18* (2013.01); *C10M 2209/084* (2013.01); *C10N 2030/02* (2013.01)

(58) Field of Classification Search
CPC ......... C10M 145/14; C10M 2209/084; C10M 2203/1025; C08F 220/18; C08F 2/06; C10N 2030/02; C10N 2020/02; C08L 33/10; C08L 91/00
See application file for complete search history.

(56) References Cited

U.S. PATENT DOCUMENTS

| | | | |
|---|---|---|---|
| 2020/0010775 A1* | 1/2020 | Ikari | C08F 290/042 |
| 2021/0147759 A1 | 5/2021 | Csihony et al. | |
| 2022/0169947 A1* | 6/2022 | Nguyen | C10M 145/14 |
| 2022/0195325 A1* | 6/2022 | Schoeller | C10M 145/14 |
| 2023/0287292 A1* | 9/2023 | Desai | C10M 141/00 |
| 2024/0124638 A1* | 4/2024 | Takashima | C10M 169/041 |

FOREIGN PATENT DOCUMENTS

WO  2018/024563 A1  2/2018

OTHER PUBLICATIONS

International Search Report and Written Opinion received for PCT Patent Application No. PCT/EP2022/083600, mailed on Feb. 15, 2023, 7 pages.
Maenz et al., "Macromonomers based on low-molecular-weight poly isobutenes", Die Angewandte Makromolekulare Chemie, vol. 242, No. 4244, Mar. 6, 1996, pp. 183-197.

* cited by examiner

*Primary Examiner* — Ellen M Mcavoy

(74) *Attorney, Agent, or Firm* — Faegre Drinker Biddle & Reath LLP

(57) ABSTRACT

The present invention relates to a comb copolymer comprising in polymerized form a PIB macromonomer of the formula (I) and an acrylate monomer of the formula (II). The invention further relates to a method of preparing the PIB macromonomer of the formula (I) where a polyisobutene phenol of the formula (III) is reacted with (meth)acrylic acid anhydride; and to a lubricant comprising a base oil, the comb copolymer, and further lubricant additives; and to a use of the comb copolymer for improving the viscosity index of a lubricating oil.

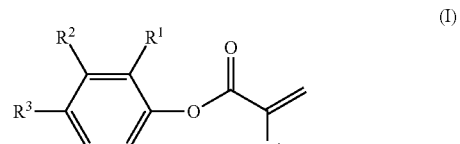

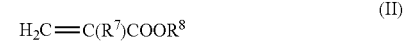

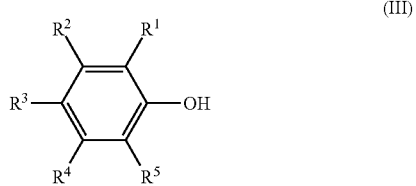

15 Claims, No Drawings

VISCOSITY INDEX IMPROVER FOR LUBRICANTS BASED ON POLYISOBUTYLENEPHENYL ACRYLATE COMB COPOLYMERS

CROSS-REFERENCE TO RELATED APPLICATIONS

This application is a National stage application (under 35 U.S.C. § 371) of PCT/EP2022/083600, filed Nov. 29, 2022, which claims benefit of European Application No. 21212540.5, filed Dec. 6, 2021, both of which are incorporated herein by reference in their entirety.

The present invention relates to a comb copolymer comprising in polymerized form a PIB macromonomer of the formula (I) and an acrylate monomer of the formula (II). The invention further relates to a method of preparing the PIB macromonomer of the formula (I) where a polyisobutene phenol of the formula (III) is reacted with (meth)acrylic acid anhydride; and to a lubricant comprising a base oil, the comb copolymer, and further lubricant additives; and to a use of the comb copolymer for improving the viscosity index of a lubricating oil. Combinations of preferred embodiments with other preferred embodiments are within the scope of the present invention.

Comb polymers are useful additives for lubricants. Polyisobutylene (PIB) based macromonomers are useful comonomers in comb polymers. However, they are difficult to synthesize.

Objects were to find an improved synthesis of macromonomers and of comb polymers and improved lubricants containing the comb polymers. Further objective was to improve lubricants containing a polymer, where the lubricant has good rheological behavior, a low polymer treat rate, a high viscosity index, a good low temperature performance (e.g. in the cold crankcase simulation), a high viscosity under severe operating conditions (e.g. in the high temperature high shear HTHS viscosity test), and a high shear stability. Comb polymers are often difficult to handle: they exhibit very high viscosities at temperatures that are applied during lubricant manufacturing. Thus, comb polymers with improved handling properties are also desired e.g. low bulk viscosities at temperatures <100° C.

The object was solved by a comb copolymer comprising in polymerized form (A) a PIB macromonomer of the formula (I)

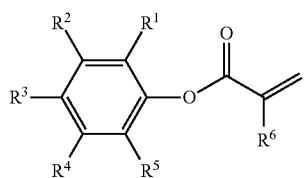

where $R^1$ to $R^5$ are selected independently from each other from the group comprising hydrogen, $C_1$-$C_{20}$-alkyl, $C_1$-$C_{20}$-alkyloxy, $C_8$-$C_{7500}$-polyisobutyl and $C_8$-$C_{7500}$-polyisobutenyl, where at least one of $R^1$ to $R^5$ is a $C_8$-$C_{7500}$-polyisobutyl or $C_8$-$C_{7500}$-polyisobutenyl group, and $R^6$ is hydrogen or methyl, and (B) an acrylate monomer of the formula (II)

$$H_2C=C(R^7)COOR^8 \quad (II)$$

where $R^7$ is hydrogen or methyl, and $R^8$ is a $C_{1-36}$ alkyl.

The PIB macromonomer may have molecular weight of 300 to 10,000 g/mol, preferably of 400 to 5000 g/mol, and in particular of 800 to 2500 g/mol.

The molecular weight of the PIB macromonomer can determined by GPC using polystyrene standards (e.g. DIN 55672-1).

Preferably, one of $R^1$ to $R^5$ (preferably $R^3$) is a $C_8$-$C_{7500}$-polyisobutyl or $C_8$-$C_{7500}$-polyisobutenyl. Preferably, $R^3$ is a $C_8$-$C_{7500}$-polyisobutyl or $C_8$-$C_{7500}$-polyiso-butenyl group. Preferably, the moieties $R^1$ to $R^5$ which are not $C_8$-$C_{7500}$-polyisobutyl or $C_8$-$C_{7500}$-polyiso-butenyl groups are selected from the group of hydrogen, methyl or tert.-butyl. In particular, $R^3$ is a $C_8$-$C_{7500}$-polyisobutyl or $C_8$-$C_{7500}$-polyiso-butenyl group, and $R^1$, $R^2$, $R^4$, and $R^5$ are selected from the group of hydrogen, methyl or tert.-butyl.

$R^6$ can be H or methyl, where methyl is preferred.

The synthesis of the PIB macromonomers is known, e.g. from K. Maenz and D. Stadermann, Angew. Makromol. Chem. 1996, 242, 183-197 "Macromonomers based on low-molecular weight polyisobutenes".

The comb copolymer may comprise up to 60, preferably up to 45 and in particular up to 30 wt % of the PIB macromonomer. In another form the comb copolymer may comprise up to 65, preferably up to 55 and in particular up to 45 wt % of the PIB macromonomer.

Typically, the comb copolymer comprises 5-55 wt %, preferably 10-45 wt %, and in particular 15-25 wt % of the PIB macromonomer. In another form the comb copolymer comprises 5-60 wt %, preferably 10-60 wt %, and in particular 15-50 wt % of the PIB macromonomer.

The wt % of a monomer usually refer to percentage by weight based on the weight of all monomers in the comb copolymer. The sum of all wt % of all monomers in the comb copolymer (e.g. the PIB macromonomer, the hydrophobic monomer, and the hydrophilic monomer) is usually 100 wt %.

$R^7$ in the acrylate monomer can be H or methyl, where methyl is preferred. $R^7$ can be different or the same in the formula (II), (IIa) and (IIb).

$R^8$ in the acrylate monomer can be a linear, branched or cyclic alkyl, preferably a linear or branched alkyl, and in particular a branched alkyl.

$R^8$ is preferably selected from $C_{1-18}$ alkyl, in particular selected from $C_{1-14}$ alkyl.

Suitable $R^8$ are methyl, ethyl, n-propyl, i-propyl, n-butyl, i-butyl, sec-butyl, tert-butyl, pentyl, hexyl, heptyl, octyl, 2-ethylhexyl, 2-propyl heptyl, 2-butyloctyl, nonyl, decyl, stearyl, 2-hexyldecyl, lauryl, octadecyl, heptadecyl, nonadecyl, eicosyl, henicosyl, docosyl, tricosyl, tetracosyl, pentacosyl, hexacosyl, heptacosyl, octacosyl, nonacosyl, triacontyl, behenyl, 2-octyldodecyl, 2-decyltetradecyl, 2-dodecyhexadecyl, 2-tetradecyloctydecyl, or mixtures of thereof. Preferably, $R^8$ comprises at least two different alkyl groups, such as two or three.

Typically, the comb copolymer comprises 25-90 wt %, preferably 35-85 wt %, and in particular 45-80 wt % of the acrylate monomer.

In a preferred form the acrylate monomer comprises a hydrophobic acrylate monomer of the formula (IIa)

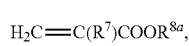 (IIa)

where $R^7$ is hydrogen or methyl, and $R^{8a}$ is $C_{5-22}$ alkyl, and an hydrophilic acrylate monomer of the formula (IIb)

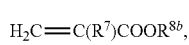 (IIb)

where $R^7$ is hydrogen or methyl, and $R^{8b}$ is $C_{1-4}$ alkyl.

$R^{8a}$ in the hydrophobic acrylate monomer can be a linear, branched or cyclic alkyl, preferably a linear or branched alkyl, and in particular a branched alkyl.

Suitable $R^{8a}$ are pentyl, hexyl, heptyl, octyl, 2-ethylhexyl, 2-propyl heptyl, 2-butyloctyl, nonyl, decyl, stearyl, lauryl, 2-hexyldecyl, octadecyl, heptadecyl, nonadecyl, eicosyl, henicosyl, docosyl, tricosyl, tetracosyl, pentacosyl, hexacosyl, heptacosyl, octacosyl, nonacosyl, triacontyl, behenyl, 2-octyldodecyl, 2-decyltetradecyl, 2-dodecyhexadecyl, 2-tetradecyloctydecyl, or mixtures of thereof.

$R^{8a}$ is preferably a $C_{6-18}$ alkyl, in particular a $C_{6-14}$ alkyl. In a preferred form $R^{8a}$ is a linear or branched $C_{6-14}$ alkyl. In another preferred form $R^{8a}$ is a branched $C_{6-10}$ alkyl. In another preferred form $R^{8a}$ is 2-ethylhexyl, 2-propyl heptyl, dodecyl, or tetradecyl, in particular 2-ethylhexyl. In another preferred form the hydrophobic acrylate monomer is 2-ethylhexyl methacrylate.

The comb copolymer may comprise at least 10 wt %, preferably at least 15 wt %, and in particular at least 25 wt % of the hydrophobic acrylate monomer. In another form the comb copolymer may comprise at least 3 wt %, preferably at least 5 wt %, and in particular at least 8 wt % of the hydrophobic acrylate monomer.

The comb copolymer may comprise up to 90 wt %, preferably up to 80 wt %, and in particular up to 75 wt % of the hydrophobic acrylate monomer. In another form the comb copolymer may comprise up to 60 wt %, preferably up to 40 wt %, and in particular up to 25 wt % of the hydrophobic acrylate monomer.

Typically, the comb copolymer comprises 15-85 wt %, preferably 20-80 wt %, and in particular 25-75 wt % of the hydrophobic acrylate monomer. In another form the comb copolymer may comprise 3-75 wt %, preferably 5-75 wt %, and in particular 10-75 wt % of the hydrophobic acrylate monomer. In yet another form the comb copolymer may comprise 3-60 wt %, preferably 5-40 wt %, and in particular 10-25 wt % of the hydrophobic acrylate monomer.

$R^{8b}$ in the hydrophilic acrylate monomer can be a linear, branched or cyclic alkyl, preferably a linear or branched alkyl, and in particular a branched alkyl.

Suitable $R^{8b}$ are methyl, ethyl, n-propyl, i-propyl, n-butyl, i-butyl, sec-butyl, tert-butyl.

$R^{8b}$ is preferably methyl or butyl. In another preferred form $R^{8b}$ is methyl or a mixture of methyl and at least one $C_{2-4}$ alkyl. In another preferred form $R^{8b}$ is methyl. In another preferred form $R^{8b}$ is a mixture of methyl and butyl, such as n-butyl.

The comb copolymer may comprise at least 1 wt %, preferably at least 5 wt %, and in particular at least 8 wt % of the hydrophilic acrylate monomer. In another form the comb copolymer may comprise at least 15 wt %, preferably at least 25 wt %, and in particular at least 35 wt % of the hydrophilic acrylate monomer.

The comb copolymer may comprise up to 50 wt %, preferably up to 40 wt %, and in particular up to 35 wt % of the hydrophilic acrylate monomer. In another form the comb copolymer may comprise up to 75 wt %, preferably up to 65 wt %, and in particular up to 55 wt % of the hydrophilic acrylate monomer.

Typically, the comb copolymer comprises 3-45 wt %, preferably 3-40 wt %, and in particular 5-35 wt % of the hydrophilic acrylate monomer. In another form the comb copolymer may comprise 3-50 wt %, preferably 5-50 wt %, and in particular 8-50 wt % of the hydrophilic acrylate monomer. In yet another form the comb copolymer may comprise 5-75 wt %, preferably 8-65 wt %, and in particular 35-55 wt % of the hydrophilic acrylate monomer.

Typically, the comb copolymer comprises 15-85 wt % hydrophobic acrylate monomer and 3-45 wt % of the hydrophilic acrylate monomer. Preferably, the comb copolymer comprises 20-80 wt % hydrophobic acrylate monomer and 3-40 wt % of the hydrophilic acrylate monomer. In another form the comb copolymer comprises up to 75 wt % of the hydrophobic acrylate monomer and at least 5 wt % of the hydrophilic acrylate monomer.

Typically, the comb copolymer comprises
5-55 wt % PIB macromonomer,
15-85 wt % hydrophobic acrylate monomer, and
1-50 wt % hydrophilic acrylate monomer,
where the sum of all monomers is 100 wt %.
In another form the comb copolymer may comprise
5-55 wt % PIB macromonomer,
10-85 wt % hydrophobic acrylate monomer, and
1-50 wt % hydrophilic acrylate monomer,
where the sum of all monomers is 100 wt %.
In another form the comb copolymer may comprise
5-55 wt % PIB macromonomer,
5-80 wt % hydrophobic acrylate monomer, and
8-65 wt % hydrophilic acrylate monomer,
where the sum of all monomers is 100 wt %.
Typically, the comb copolymer comprises
10-45 wt % PIB macromonomer,
20-80 wt % hydrophobic acrylate monomer, and
3-45 wt % hydrophilic acrylate monomer,
where the sum of all monomers is 100 wt %.
In another form the comb copolymer may comprise
5-55 wt % PIB macromonomer,
5-35 wt % hydrophobic acrylate monomer, and
20-60 wt % hydrophilic acrylate monomer,
where the sum of all monomers is 100 wt %.

The comb copolymer may comprise further monomers different from the PIB macromonomer, the hydrophobic monomer or the hydrophilic monomer. As further comonomers can be employed:
hydroxyl-, epoxy- or amino-functional (meth)acrylates
vinylaromatic compounds, such as styrene, alpha-methylstyrene, vinyltoluene or p-(tert-butyl) styrene;
acrylic and methacrylic acid;
acrylamide and methacrylamide;
maleic acid and the imides and $C_1$-$C_{10}$-alkyl esters thereof;
fumaric acid and the imides and $C_1$-$C_{10}$-alkyl esters thereof;
itaconic acid and the imides and $C_1$-$C_{10}$-alkyl esters thereof;
acrylonitrile and methacrylonitrile.

The comb copolymer may comprise up to 15 wt %, preferably up to 5 wt %, and in particular up to 1 wt % of the further monomer. In another form the comb copolymer is free of the further monomer.

The comb copolymer may have a molecular weight Mn from 10,000 to 1,500,000 g/mol, preferably from 20,000 to 1,000,000 g/mol, and in particular from 50,000 to 200,000 g/mol.

The comb copolymer may have a molecular weight Mw from 50,000 to 2,000,000 g/mol, preferably from 100,000 to 1,000,000 g/mol, and in particular from 200,000 to 600,000 g/mol.

The comb copolymer may have a polydispersity index (PDI) from 1.5-5.0, preferably from 2.0-4.5, and in particular from 2.9-4.3.

The molecular weight of the comb copolymer can be determined by GPC using polystyrene standards (e.g. DIN 55672-1).

The kinematic viscosity at 100° C. (KV100, usually measured with Brookfield viscometer.) of the comb copolymer in a 30 wt % solution of a base oil (e.g. Nexbase® 3030) can be below 600 mm$^2$/s, preferably below 300 mm$^2$/s, and in particular below 150 mm$^2$/s.

The comb copolymer can be prepared by conventional free-radical polymerization, such as bulk polymerization or solution polymerization, where the latter is preferred.

In the solution polymerization the reaction mixture may comprises a diluent, the monomers, a polymerization initiator and optionally a chain transfer agent and optionally a crosslinker. The diluent may be any inert hydrocarbon. The concentration of total monomers may range from about 30 to 100%. As used herein, "total monomer charge" means the combined amount of all monomers in the initial reaction mixture.

The diluent may be any inert hydrocarbon or an dicarboxylic ester, which is an diester of at least one linear or branched C2-C20 dicarboxylic acid with at least one linear or branched C1-C20 monoalcohol. The dicarboxylic ester preferably is derived from the reaction of a dicarboxylic acid with an aliphatic alcohol. Preferred dicarboxylic acids are adipic acid, pimelic acid, suberic acid, azelaic acid and sebacic acid and mixtures thereof. The dicarboxylic acid ester component is preferably formed from such dicarboxylic acids by esterification with medium-size aliphatic alcohols, which can be linear or branched, preferably C5 to C20 alcohol, more preferably C9 to C15 aliphatic alcohol and most preferably nonanol, isodecanol, isotridecanol and 2-propyl heptanol. The diluent is preferably di-(2-propylheptyl)-adipat.

Preferably, the comb copolymer is present in a diluent, which is a dicarboxylic ester, preferably a diester of at least one linear or branched C2-C20 dicarboxylic acid with at least one linear or branched C1-C20 monoalcohol, and in particular di-(2-propylheptyl)-adipat.

Suitable polymerization initiators include initiators which disassociate upon heating to yield a free radical, e.g., peroxide compounds such as benzoyl peroxide, t-butyl perbenzoate, t-butyl peroctoate and cumene hydroperoxide; and azo compounds such as azoisobutyronitrile and 2,2'-azobis (2-methylbutanenitrile). The mixture includes from about 0.001 wt percent to about 5.0 wt percent initiator relative to the total monomer mixture. For example, 0.02 weight percent to about 4.0 weight percent, 0.02 weight percent to about 3.5 weight percent are envisioned. Typically, about 0.02 weight percent to about 2.0 weight percent are used.

Suitable chain transfer agents include mercaptanes and alcohols. For example, tridecyl mercap-tane, dodecyl mer- captane and ethyl mercaptane, but also bifunctional mercaptanes, such hexanedithiol may be used as chain transfer agents. The selection of the amount of chain transfer agent to be used is based on the desired molecular weight of the polymer being synthesized. The chain transfer agent is often added to the reaction mixture or monomer feed in an amount of 0.001 to 3 weight percent relative to the monomer mixture.

All components may be charged to a reaction vessel that is equipped with a stirrer, a thermometer and a reflux condenser and heated with stirring under a nitrogen blanket to a temperature from about 50 degrees centigrade to about 125 degrees centigrade for a period of about 0.5 hours to about 15 hours to carry out the polymerization reaction.

The present invention also relates to a method of preparing the PIB macromonomer of the formula (I)

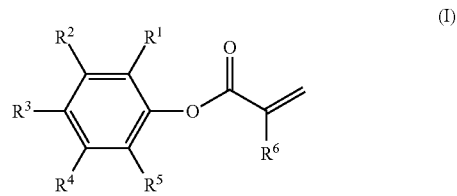

where $R^1$ to $R^5$ are selected—independently from each other—from the group comprising hydrogen, $C_1$-$C_{20}$-alkyl, $C_1$-$C_{20}$-alkyloxy und $C_8$-$C_{7500}$-polyisobutyl und $C_8$-$C_{7500}$-polyisobutenyl, where at least one of $R^1$ to $R^5$ is a $C_8$-$C_{7500}$-polyisobutyl or $C_8$-$C_{7500}$-polyiso-butenyl group, and $R^6$ is hydrogen or methyl, where a polyisobutene phenol of the formula (III)

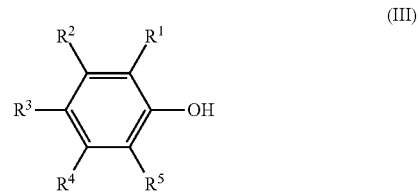

is reacted with (meth)acrylic acid anhydride.

The polyisobutene phenol of the formula (III) can be prepared as described in WO 2018/024563. The polyisobutene phenol may have molecular weight of 300 to 10,000 g/mol, preferably of 400 to 5000 g/mol, and in particular of 800 to 2500 g/mol·s The (meth)acrylic acid anhydride is preferably present in a molar excess in relation to the polyisobutene phenol, e.g. in at least 1.1, 1.5 or 2-fold molar excess.

The reaction between the polyisobutene phenol and the (meth)acrylic acid anhydride can take place at a reaction temperature in the range from 0-120° C., preferably 10-100° C.

The reaction between the polyisobutene phenol and the (meth)acrylic acid anhydride can take place in an organic solvent, such as a hydrocarbon solvent.

The reaction between the PIB-amine and the meth)acrylic acid anhydride is usually followed by hydrolysis of the remaining (meth)acrylic acid anhydride to form (meth) acrylic acid. The (meth)acrylic acid can be removed by distillation or by extraction with water.

The invention also relates to a lubricant comprising
(i) a base oil,
(ii) the comb copolymer or the comb copolymer obtainable by the method according to the invention, and
(iii) further lubricant additives.

The lubricant may comprise at least 0.1 wt %, preferably at least 0.5 wt % and in particular at least 1 wt % of the comb copolymer. In another form the lubricant may comprise 0.1-20 wt %, preferably 0.1-150 wt % and in particular at least 0.1-10 wt % of the comb copolymer.

The lubricant may comprise at least 30 wt %, preferably at least 50 wt % and in particular at least 70 wt % of the base oil. The lubricant may comprise 30-99.9 wt %, preferably 50-99 wt % and in particular 70-95 wt % of the base oil.

The lubricant may comprise up to 20 wt %, preferably up to 15 wt % and in particular up to 10 wt % of the further lubricant additive.

Lubricants usually refers to composition which are capable of reducing friction between surfaces (preferably metal surfaces), such as surfaces of mechanical devices. A mechanical device may be a mechanism consisting of a device that works on mechanical principles. Suitable mechanical device are bearings, gears, joints and guidances. The mechanical device may be operated at temperatures in the range of −30 C to 80° C. The lubricant is usually a lubricating liquid, lubricating oil or lubricating grease.

Lubricants are usually specifically formulated for virtually every type of machine and manufacturing process. The type and concentration of base oils and/or lubricant additives used for these lubricants may be selected based on the requirements of the machinery or process being lubricated, the quality required by the builders and the users of the machinery, and the government regulation. Typically, each lubricant has a unique set of performance requirements. In addition to proper lubrication of the machine or process, these requirements may include maintenance of the quality of the lubricant itself, as well as the effect of the lubricant's use and disposal on energy use, the quality of the environment, and on the health of the user.

Typical lubricants are automotive lubricants (e.g. gasoline engine oils, diesel engine oils, gas engine oils, gas turbine oils, automatic transmission fluids, gear oils) and industrial lubricants (e.g. industrial gear oils, pneumatic tool lubricating oil, high temperature oil, gas compressor oil, hydraulic fluids, metalworking fluids).

Examples for lubricants are axel lubrication, medium and heavy duty engine oils, industrial engine oils, marine engine oils, automotive engine oils, crankshaft oils, compressor oils, refrigerator oils, hydrocarbon compressor oils, very low-temperature lubricating oils and fats, high temperature lubricating oils and fats, wire rope lubricants, textile machine oils, refrigerator oils, aviation and aerospace lubricants, aviation turbine oils, transmission oils, gas turbine oils, spindle oils, spin oils, traction fluids, transmission oils, plastic transmission oils, passenger car transmission oils, truck transmission oils, industrial transmission oils, industrial gear oils, insulating oils, instrument oils, brake fluids, transmission liquids, shock absorber oils, heat distribution medium oils, transformer oils, fats, chain oils, minimum quantity lubricants for metalworking operations, oil to the warm and cold working, oil for water-based metalworking liquids, oil for neat oil metalworking fluids, oil for semi-synthetic metalworking fluids, oil for synthetic metalworking fluids, drilling detergents for the soil exploration, hydraulic oils, in biodegradable lubricants or lubricating greases or waxes, chain saw oils, release agents, molding fluids, gun, pistol and rifle lubricants or watch lubricants and food grade approved lubricants.

The lubricant has usually may have a kinematic viscosity at 40° C. of at least 10, 50, 100, 150, 200, 300, 400, 500, 600, 900, 1400, or 2000 mm$^2$/s. In another form the lubricant has usually may have a kinematic viscosity at 40° C. from 200 to 30 000 mm$^2$/s (cSt), preferably from 500 to 10 000 mm$^2$/s, and in particular from 1000 to 5000 mm$^2$/s.

The lubricant has usually may have a kinematic viscosity at 100° C. of at least 2, 3, 5, 10, 20, 30, 40, or 50 mm$^2$/s. In another form the lubricant may have a kinematic viscosity at 100° C. from 10 to 5000 mm$^2$/s (cSt), preferably from 30 to 3000 mm$^2$/s, and in particular from 50 to 2000 mm$^2$/s The lubricant may have a viscosity index (VI) of at least 150, 160, 170, 180, 190 or 200.

The base oil may selected from the group consisting of mineral oils (Group I, II or III oils), polyalphaolefins (Group IV oils), polymerized and interpolymerized olefins, alkyl naphthalenes, alkylene oxide polymers, silicone oils, phosphate esters and carboxylic acid esters (Group V oils). Preferably, the base oil is selected from Group I, Group II, Group III base oils according to the definition of the API, or mixtures thereof. Definitions for the base oils are the same as those found in the American Petroleum Institute (API) publication "Engine Oil Licensing and Certification System", Industry Services Department, Fourteenth Edition, December 1996, Addendum 1, December 1998. Said publication categorizes base oils as follows:
  a) Group I base oils contain less than 90 percent saturates (ASTM D 2007) and/or greater than 0.03 percent sulfur (ASTM D 2622) and have a viscosity index (ASTM D 2270) greater than or equal to 80 and less than 120.
  b) Group II base oils contain greater than or equal to 90 percent saturates and less than or equal to 0.03 percent sulfur and have a viscosity index greater than or equal to 80 and less than 120.
  c) Group III base oils contain greater than or equal to 90 percent saturates and less than or equal to 0.03 percent sulfur and have a viscosity index greater than or equal to 120.
  d) Group IV base oils contain polyalphaolefins. Polyalphaolefins (PAO) include known PAO materials which typically comprise relatively low molecular weight hydrogenated polymers or oligomers of alphaolefins which include but are not limited to C2 to about C32 alphaole-fins with the C8 to about C16 alphaolefins, such as 1-octene, 1-decene, 1-dodecene and the like being preferred. The preferred polyalphaolefins are poly-1-octene, poly-1-decene, and poly-1-dode-cene.
  e) Group V base oils contain any base oils not described by Groups I to IV. Examples of Group V base oils include alkyl naphthalenes, alkylene oxide polymers, silicone oils, and phosphate esters.

Synthetic base oils include hydrocarbon oils and halo-substituted hydrocarbon oils such as pol-ymerized and interpolymerized olefins (e.g., polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhexyl)benzenes); poly-phenyls (e.g., biphenyls, terphenyls, alkylated polyphenols); and alkylated diphenyl ethers and alkylated diphenyl sulfides and derivative, analogs and homologs thereof.

Alkylene oxide polymers and interpolymers and derivatives thereof where the terminal hydroxyl groups have been modified by esterification, etherification, etc., constitute another class of known synthetic base oils. These are exemplified by polyoxyalkylene polymers prepared by polymerization of ethylene oxide or propylene oxide, and the alkyl and aryl ethers of polyoxyalkylene poly-mers (e.g., methylpolyiso-propylene glycol ether having a molecular weight of 1000 or diphenyl ether of polyethylene glycol having a molecular weight of 1000 to 1500); and mono- and polycarboxylic esters thereof, for example, the acetic acid esters, mixed C3-C8 fatty acid esters and C13 oxo acid diester of tetraethylene glycol.

Silicon-based oils such as the polyalkyl-, polyaryl-, polyalkoxy- or polyaryloxysilicone oils and sili-cate oils comprise another useful class of synthetic base oils; such base oils include tetraethyl silicate, tetraisopropyl silicate, tetra-(2-ethylhexyl) silicate, tetra-(4-methyl-2-ethylhe-xyl) silicate, tetra-(p-tert-butyl-phenyl) silicate, hexa-(4-methyl-2-ethylhexyl)disiloxane, poly(methyl) siloxanes and poly(methylphenyl)siloxanes. Other synthetic base oils include liquid esters of phosphorous-containing acids (e.g., tricresyl phosphate, trioctyl phosphate, diethyl ester of decylphosphonic acid) and polymeric tetrahydrofurans.

Suitable lubricant additives may be selected from viscosity index improvers, polymeric thickeners, antioxidants, corrosion inhibitors, detergents, dispersants, anti-foam agents, dyes, wear protection additives, extreme pressure additives (EP additives), anti-wear additives (AW additives), friction modifiers, metal deactivators, pour point depressants.

The viscosity index improvers include high molecular weight polymers that increase the relative viscosity of an oil at high temperatures more than they do at low temperatures. Viscosity index improvers include polyacrylates, polymethacrylates, alkylmethacrylates, vinylpyrrolidone/me-thacrylate copolymers, poly vinylpyrrolidones, polybutenes, olefin copolymers such as an ethylene-propylene copolymer or a styrene-butadiene copolymer or polyalkene such as PIB, styrene/acrylate copolymers and polyethers, and combinations thereof. The most common VI improvers are methacrylate polymers and copolymers, acrylate polymers, olefin polymers and copolymers, and styrenebutadiene copolymers. Other examples of the viscosity index improver include polymethacrylate, polyisobutylene, alpha-olefin polymers, alpha-olefin copolymers (e.g., an ethylenepropylene copolymer), polyalkylstyrene, phenol condensates, naphthalene condensates, a styrenebutadiene copolymer and the like. Of these, polymethacrylate having a number average molecular weight of 10000 to 300000, and alpha-olefin polymers or alpha-olefin copolymers having a number average molecular weight of 1000 to 30000, particularly ethylene-alpha-olefin copolymers having a number average molecular weight of 1000 to 10000 are preferred. The viscosity index increasing agents can be added and used individually or in the form of mixtures, conveniently in an amount within the range of from ≥0.05 to ≤20.0% by weight, in relation to the weight of the base stock.

Suitable (polymeric) thickeners include, but are not limited to, polyisobutenes (PIB), oligomeric co-polymers (OCPs), polymethacrylates (PMAs), copolymers of styrene and butadiene, or high viscosity esters (complex esters).

Antioxidants include phenolic antioxidants such as hindered phenolic antioxidants or non-phenolic oxidation inhibitors.

Useful phenolic antioxidants include hindered phenols. These phenolic antioxidants may be ashless (metal-free) phenolic compounds or neutral or basic metal salts of certain phenolic compounds. Typical phenolic antioxidant compounds are the hindered phenolics which are the ones which contain a sterically hindered hydroxyl group, and these include those derivatives of dihydroxy aryl compounds in which the hydroxyl groups are in the o- or p-position to each other. Typical phenolic antioxidants include the hindered phenols substituted with alkyl groups having 6 carbon atoms or more and the alkylene coupled derivatives of these hindered phenols. Examples of phenolic materials of this type 2-t-butyl-4-heptyl phenol; 2-t-butyl-4-octyl phenol; 2-t-butyl-4-dodecyl phenol; 2,6-di-tbutyl-4-heptyl phenol; 2,6-di-t-butyl-4-dodecyl phenol; 2-methyl-6-t-butyl-4-heptyl phenol; and 2-methyl-6-t-butyl-4-dodecyl phenol. Other useful hindered mono-phenolic antioxidants may include for example hindered 2,6-di-alkyl phenolic propionic ester derivatives. Bis-phenolic antioxidants may also be used in combination with the present invention. Examples of ortho-coupled phenols include: 2,2'-bis(4-heptyl-6-t-butyl-phenol); 2,2'-bis(4-octyl-6-t-butyl-phenol); and 2,2'-bis(4-dodecyl-6-t-butyl-phenol). Para-coupled bisphenols include for example 4,4'-bis(2,6-di-t-butyl phenol) and 4,4' methylene-bis(2,6-di-t-butyl phenol).

Non-phenolic oxidation inhibitors which may be used include aromatic amine antioxidants and these may be used either as such or in combination with phenolics. Typical examples of non-phenolic antioxidants include: alkylated and non-alkylated aromatic amines such as aromatic monoamines of the formula $R^8R^9R^{10}N$, where $R^8$ is an aliphatic, aromatic or substituted aromatic group, $R^9$ is an aromatic or a substituted aromatic group, and $R^{10}$ is H, alkyl, aryl or $R^{11}S(O)_xR^{12}$, where $R^{11}$ is an alkylene, alkenylene, or aralkylene group, $R^{12}$ is a higher alkyl group, or an alkenyl, aryl, or alkaryl group, and x is 0, 1 or 2. The aliphatic group $R^8$ may contain from 1 to about 20 carbon atoms, and preferably contains from about 6 to 12 carbon atoms. The aliphatic group is a saturated aliphatic group. Preferably, both $R^8$ and $R^9$ are aromatic or substituted aromatic groups, and the aromatic group may be a fused ring aromatic group such as naphthyl. Aromatic groups $R^8$ and $R^9$ may be joined together with other groups such as S.

Typical aromatic amines antioxidants have alkyl substituent groups of at least about 6 carbon atoms. Examples of aliphatic groups include hexyl, heptyl, octyl, nonyl, and decyl. Generally, the aliphatic groups will not contain more than about 14 carbon atoms. The general types of amine antioxidants useful in the present compositions include diphenylamines, phenyl naphthylamines, phenothiazines, imidodibenzyls and diphenyl phenylene diamines. Mixtures of two or more aromatic amines are also useful. Polymeric amine antioxidants can also be used. Particular examples of aromatic amine antioxidants useful in the present invention include: p,p'-dioctyldiphenylamine; t-octylphenyl-alpha naphthylamine; phenyl-alphanaphthylamine; and p-octylphenyl-alphanaphthylamine. Sulfurized alkyl phenols and alkali or alkaline earth metal salts thereof also are useful antioxidants.

Corrosion inhibitors may include various oxygen-, nitrogen-, sulfur-, and phosphorus-containing materials, and may include metal-containing compounds (salts, organometallics, etc.) and nonmetal-containing or ashless materials. Corrosion inhibitors may include, but are not limited to, additive types such as, for example, hydrocarbyl-, aryl-, alkyl-, arylalkyl-, and alkylaryl versions of detergents (neutral, overbased), sulfonates, phenates, salicylates, alcoholates, carboxylates, salixarates, phosphites, phosphates, thiophosphates, amines, amine salts, amine phosphoric acid salts, amine sulfonic acid salts, alkoxylated amines, ether-amines, polyether-amines, amides, imides, azoles, diazoles, triazoles, benzotriazoles, benzothiadoles, mercapto-benzothiazoles, tolyltriazoles (TTZ-type), heterocyclic amines, heterocyclic sulfides, thiazoles, thiadiazoles, mercaptothiadiazoles, dimercaptothiadiazoles (DMTD-type), imidazoles, benzimidazoles, dithiobenzimidazoles, imidazolines, oxazolines, Mannich reactions products, glycidyl ethers, anhydrides, carbamates, thiocarbamates, dithiocarbamates, polyglycols, etc., or mixtures thereof.

Detergents include cleaning agents that adhere to dirt particles, preventing them from attaching to critical surfaces. Detergents may also adhere to the metal surface itself to keep it clean and prevent corrosion from occurring. Detergents include calcium alkylsalicylates, calcium alkylphenates and calcium alkarylsulfonates with alternate metal ions used such as magnesium, barium, or sodium. Examples of the cleaning and dispersing agents which can be used include metal-based detergents such as the neutral and basic alkaline earth metal sulphonates, alkaline earth metal phenates and alkaline earth metal salicylates alkenylsuccinimide and alkenylsuccinimide esters and their borohydrides, phenates, salienius complex detergents and ashless dispersing agents which have been modified with sulphur compounds. These agents can be added and used individually or in the form of mixtures, conveniently in an amount within the range of from ≥0.01 to ≤1.0% by weight in relation to the weight of the base stock; these can also be high total base number (TBN), low TBN, or mixtures of high/low TBN.

Dispersants are lubricant additives that help to prevent sludge, varnish and other deposits from forming on critical surfaces. The dispersant may be a succinimide dispersant (for example N-substituted long chain alkenyl succinimides), a Mannich dispersant, an ester-containing dispersant, a condensation product of a fatty hydrocarbyl monocarboxylic acylating agent with an amine or ammonia, an alkyl amino phenol dispersant, a hydrocarbyl-amine dispersant, a polyether dispersant or a polyetheramine dispersant. In one embodiment, the succinimide dispersant includes a polyisobutylene-substituted succinimide, wherein the polyisobutylene from which the dispersant is derived may have a number average molecular weight of about 400 to about 5000, or of about 950 to about 1600. In one embodiment, the dispersant includes a borated dispersant. Typically, the borated dispersant includes a succinimide dispersant including a polyisobutylene succinimide, wherein the polyisobutylene from which the dispersant is derived may have a number average molecular weight of about 400 to about 5000. Borated dispersants are described in more detail above within the extreme pressure agent description.

Anti-foam agents may be selected from silicones, polyacrylates, and the like. The amount of anti-foam agent in the lubricant compositions described herein may range from ≥0.001 wt.-% to ≤0.1 wt.-% based on the total weight of the formulation. As a further example, an anti-foam agent may be present in an amount from about 0.004 wt.-% to about 0.008 wt.-%.

Suitable extreme pressure agent is a sulfurcontaining compound. In one embodiment, the sulfur-containing compound may be a sulfurised olefin, a polysulfide, or mixtures thereof. Examples of the sulfurised olefin include a sulfurised olefin derived from propylene, isobutylene, pentene; an organic sulfide and/or polysulfide including benzyldisulfide; bis-(chlorobenzyl) disulfide; dibutyl tetrasulfide; di-tertiary butyl polysulfide; and sulfurised methyl ester of oleic acid, a sulfurised alkylphenol, a sulfurised dipentene, a sulfurised terpene, a sulfurised Diels-Alder adduct, an alkyl sulphenyl N'N dialkyl dithiocarbamates; or mixtures thereof. In one embodiment, the sulfurised olefin includes a sulfurised olefin derived from propylene, isobutylene, pentene or mixtures thereof. In one embodiment the extreme pressure additive sulfur-containing compound includes a dimercaptothiadiazole or derivative, or mixtures thereof. Examples of the dimercaptothiadiazole include compounds such as 2,5-dimercapto-1,3,4-thiadiazole or a hydrocarbyl-substituted 2,5-dimercapto-1,3,4-thiadiazole, or oligomers thereof. The oligomers of hydrocarbyl-substituted 2,5-dimercapto-1,3,4-thiadiazole typically form by forming a sulfur-sulfur bond between 2,5-dimercapto-1,3,4-thiadiazole units to form derivatives or oligomers of two or more of said thiadiazole units. Suitable 2,5-dimercapto-1,3,4-thiadiazole derived compounds include for example 2,5-bis(tert-nonyldithio)-1,3,4-thiadiazole or 2-tert-nonyldithio-5-mercapto-1,3,4-thiadiazole. The number of carbon atoms on the hydrocar-byl substituents of the hydrocarbyl-substituted 2,5-dimercapto-1,3,4-thiadiazole typically include 1 to 30, or 2 to 20, or 3 to 16. Extreme pressure additives include compounds containing boron and/or sulfur and/or phosphorus. The extreme pressure agent may be present in the lubricant compositions at 0 wt.-% to about 20 wt.-%, or at about 0.05 wt.-% to about 10.0 wt.-%, or at about 0.1 wt.-% to about 8 wt.-% of the lubricant composition.

Examples of anti-wear additives include organo borates, organo phosphites such as didodecyl phosphite, organic sulfur-containing compounds such as sulfurized sperm oil or sulfurized terpenes, zinc dialkyl dithiophosphates, zinc diaryl dithiophosphates, phosphosulfurized hydrocarbons and any combinations thereof.

Friction modifiers may include metal-containing compounds or materials as well as ashless compounds or materials, or mixtures thereof. Metal-containing friction modifiers include metal salts or metalligand complexes where the metals may include alkali, alkaline earth, or transition group metals. Such metal-containing friction modifiers may also have lowash characteristics. Transition metals may include Mo, Sb, Sn, Fe, Cu, Zn, and others. Ligands may include hydrocarbyl derivative of alcohols, polyols, glycerols, partial ester glycerols, thiols, carboxy-lates, carbamates, thiocarbamates, dithiocarbamates, phosphates, thiophosphates, dithiophosphates, amides, imides, amines, thiazoles, thiadiazoles, dithiazoles, diazoles, triazoles, and other polar molecular functional groups containing effective amounts of O, N, S, or P, individually or in combination. In particular, Mo-containing compounds can be particularly effective such as for example Mo-dithiocarbamates, Mo(DTC), Mo-dithiophosphates, Mo(DTP), Mo-amines, Mo (Am), Mo-alcoholates, Mo alcohol-amides, and the like.

Ashless friction modifiers may also include lubricant materials that contain effective amounts of polar groups, for example, hydroxyl-containing hydrocarbyl base oils, glycerides, partial glycerides, glyceride derivatives, and the like. Polar groups in friction modifiers may include hydrocarbyl groups containing effective amounts of O, N, S, or P, individually or in combination. Other friction modifiers that may be particularly effective include, for example, salts (both ash-containing and ashless derivatives) of fatty acids, fatty alcohols, fatty amides, fatty esters, hydroxyl-containing carboxylates, and comparable synthetic long-chain hydrocarbyl acids, alcohols, amides, esters, hydroxy carboxylates, and the like. In some instances, fatty organic acids, fatty amines, and sulfurized fatty acids may be used as suitable friction modifiers. Examples of friction modifiers include fatty acid esters and amides, organo molybdenum compounds, molybdenum dialkylthiocarbamates and molybdenum dialkyl dithiophosphates.

Suitable metal deactivators include benzotriazoles and derivatives thereof, for example 4- or 5-alkylbenzotriazoles (e.g. triazole) and derivatives thereof, 4,5,6,7-tetrahydrobenzotriazole and 5,5'-methylenebisbenzotriazole; Mannich bases of benzotriazole or triazole, e.g. 1-[bis(2-ethyl-hexyl) aminomethyl) triazole and 1-[bis(2-ethylhexyl) aminomethyl)benzotriazole; and alkoxyal-kylbenzotriazoles such as 1-(nonyloxy-methyl)benzotriazole, 1-(1-butoxyethyl) benzotriazole and 1-(1-cyclohexyloxybutyl) triazole, and combinations thereof. Additional non-limiting examples of the one or more metal deactivators include 1,2,4-triazoles and derivatives thereof, for example 3-alkyl (or aryl)-1,2,4-triazoles, and Mannich bases of 1,2,4-triazoles, such as 1-[bis(2-ethylhexyl) aminomethyl-1,2,4-triazole; alkoxyal-kyl-1,2,4-triazoles such as 1-(1-bu-toxyethyl)-1,2,4-triazole; and acylated 3-amino-1,2,4-triazoles, imidazole derivatives, for example 4,4'-methylenebis(2-undecyl-5-methylimidazole) and bis[(N-methyl)imidazol-2-yl]car-binol octyl ether, and combinations thereof. Further non-limiting examples of the one or more metal deactivators include sulfur-containing heterocyclic compounds, for example 2-mercapto-benzothiazole, 2,5-dimercapto-1,3,4-thia-diazole and derivatives thereof; and 3,5-bis[di(2-ethylhexyl) aminomethyl]-1,3,4-thiadiazolin-2-one, and combinations thereof. Even further non-limiting examples of the one or more metal deactivators include amino compounds, for example salicylidenepropylenediamine, salicylami-noguanidine and salts thereof, and combinations thereof. The one or more metal deactivators are not particularly limited in amount in the composition but are typically present in an amount of from about 0.01 to about 0.1, from about 0.05 to about 0.01, or from about 0.07 to about 0.1, wt.-% based on the weight of the composition. Alternatively, the one or more metal deactivators may be present in amounts of less than about 0.1, of less than about 0.7, or less than about 0.5, wt.-% based on the weight of the composition.

Pour point depressants (PPD) include polymethacrylates, alkylated naphthalene derivatives, and combinations thereof. Commonly used additives such as alkylaromatic polymers and polymethacrylates are also useful for this purpose. Typically, the treat rates range from ≥0.001 wt.-% to ≤1.0 wt.-%, in relation to the weight of the base stock.

Demulsifiers include trialkyl phosphates, and various polymers and copolymers of ethylene glycol, ethylene oxide, propylene oxide, or mixtures thereof.

The invention also relates to a use of the comb copolymer or the comb copolymer obtainable by the method according the invention for improving the viscosity index of the lubricant.

EXAMPLES

Example 1

A polyisobutylene phenol ("PIB-Phenol 1000") was prepared from polyisobutene (Mn 1000 g/mol) and phenol catalyzed by BF3-phenol complex according to WO 2018/024563. It was obtained as a 70 wt % solution in a hydrogenated, highly isoparaffinic hydrocarbon solvent (KV100 3.0 mm2/s, VI 111, pour point −30° C.) with an average molecular weight of 1350 g/mol (calculated from OH number OHN) and an average number of isobutene units of 22.5.

907 g of PIB-Phenol 1000, 0.39 g 2,6-di-tert-butyl-4-methylphenol BHT, 67.6 g methacrylic acid anhydride MAAh were heated to 86° C. After 4 h 0.5 g NaOH (50 wt % in water) were added. After 12 h further 23.1 g MAAh were added. After a total of 16 h reaction time 150 g water were added and stirred for 11 h at a bath temperature of 95° C. Excess MAAh and water were distilled off in vacuum. 922 g of a product solution were obtained. Conversion was quantitative as determined by 1H NMR. Neither MAAh nor methacrylic acid MAA could be identified.

Example 2

A polyisobutylene phenol ("PIB-Phenol 2300") was prepared from polyisobutene (Mn 2300 g/mol) and phenol catalyzed by BF3-phenol complex according to WO 2018/024563. It was obtained without solvent and with an average molecular weight of 3300 g/mol (calculated from OHN) and an average number of isobutene units of 57.1.

277 g of PIB-Phenol 2300, 119 g hydrogenated, highly isoparaffinic hydrocarbons solvent (cf. Example 1), 0.12 g BHT, and 16.5 g MAAh were heated to 85° C. After 1.4 h 0.13 g NaOH (50 wt % in water) were added. After a total of 9 h reaction time 50 g water were added and stirred for 19 h at a bath temperature of 95° C. Bath temperature was then reduced to 70° C. and the aqueous phase was discharged after phase separation.

Additional 50 g of water were added, and the mixture stirred for 5 min. After separation of the phases the aqueous phase was discharged. Excess MAA and water were distilled off in vacuum. 382 g of a product solution were obtained. Conversion was quantitative as determined by 1H NMR. Neither MAAh nor MAA could be identified.

Example 3

In a reactor were added:
71.4 g PIB macromonomer from Example 1 (70 wt % solution)
175 g EHMA 2-Ethylhexyl methacrylate
25 g MMA Methyl methacrylate
0.20 g TDDM tert-dodecyl mercaptan
145 g Nexbase® 3030

The monomers % by weight were: 20 wt % PIB macromonomer, 70 wt % EHMA, 10 wt % MMA.

The mixture was heated under nitrogen and under stirring up to 95° C. As soon as the 95° C. were achieved then within 5 minutes ⅓ of the total solution of initiator terbutyl-peroxyethylhexanoate TBPEH was added (3 g TBPEH in 29.64 g of Catenex T121 is the total solution). The mixture was stirred for additionally 10 minutes. After that ⅔ of the TBPEH solution was added in 3 portions during 3 hours: Portion 1=1 g, Portion 2=2 g, Portion 3: 2 g. After that the mixture was treated during 1 hour at 95° C. A last addition of 5.56 g of the 9% solution of TBPEH was added and the mixture is stirred at 95° C. for 1 additional hour.

After 1 hour 408.3 g of Nextbase® 3030 (hydrogenated, highly isoparaffinic hydrocarbons base stock, from Neste, KV40 12 mm$^2$/s, KV100 3.0 mm$^2$/s, VI 111) were added to bring the total polymer content to approx. 30%. The mixture was stirred during 30 min for homogeneity.

The molecular weight was determined by GPC with polystyrol calibration: Mn 108,000 g/mol, Mw 392,000 g/mol, PDI 3.6.

The application test results were as follows:
KV100: 357 mm$^2$/s (30 wt % polymer solution)
KV40: 36.95 mm$^2$/s (5 wt % of the 30 wt % polymer solution)
KV100: 7.7 mm$^2$/s (5 wt % of the 30 wt % polymer solution)
VI: 186

The kinematic viscosity at 100° C. (KV100) of the lubricant was determined according to ASTM D445/446.

The higher the viscosity index VI (DIN ISO 2909), the smaller the effect of temperature on the kinematic viscosity.

Example 4

In a reactor were added:
132.2 g PIB macromonomer from Example 1 (70 wt % solution)
52.6 g EHMA 2-Ethylhexyl methacrylate
21.5 g MMA Methyl methacrylate
60.5 g NBMA n-butyl methacrylate
23.8 g LMA lauryl methacrylate
0.15 g TDDM tert-dodecyl mercaptan
127 g Nexbase® 3030

Lauryl methacrylate is a technical mixture comprising mainly C12/C14 methacrylates (70-75% C12, 24-30% C14, an minor amounts of C10 and C16).

The monomers % by weight were: 37 wt % PIB macromonomer, 21 wt % EHMA, 8.5 wt % MMA, 24% NBMA, and 9.5 wt % LMA.

The monomers were polymerized as described in Example 3.

The molecular weight was determined by GPC with polystyrol calibration: Mn 135,000 g/mol, Mw 562,000 g/mol, PDI 4.2.

The application test results were as follows:
KV100: 402 mm$^2$/s (30 wt % polymer solution)
KV40: 35.6 mm$^2$/s (5 wt % of the 30 wt % polymer solution)
KV100: 7.5 mm$^2$/s (5 wt % of the 30 wt % polymer solution)
VI: 186

Example 5

In a reactor were added:
142.9 g PIB macromonomer from Example 2 (70 wt % solution)
37.5 g 2-Ethylhexyl methacrylate
12.5 g Methyl methacrylate
100.0 g n-Butyl Methacrylate
0.04 g tert-dodecyl mercaptan
123.9 g Yubas® 3 (hydrotreated light paraffinic mineral oil, from SK Lubricants, Korea, CAS 64742-55-8)

The monomers % by weight were: 40 wt % PIB macromonomer, 15 wt % EHMA, 5 wt % MMA, 40 wt % NBMA. The monomers were polymerized as described in Example 3. At the end Yubas® 3 was added to bring the total polymer content to approx. 30%.

The molecular weight was determined by GPC with polystyrol calibration: Mn 146,000 g/mol, Mw 387000 g/mol, PDI 2.6.

The application test results were as follows:
KV100: 519 mm$^2$/s (30 wt % polymer solution)
KV100: 6.8 mm$^2$/s (5 wt % in Chevron® 150R)
KV40: 6.88 mm$^2$/s (5 wt % in Chevron® 150R)
VI: 177

Chevron® 150 R is a Group II paraffinic base oil with KV40 29.4 mm$^2$/s, KV100 5.25 mm$^2$/s (ASTM D445), VI of 112).

The shear stability was determined by 30 cycles Bosch diesel injector pump according to CEC L-14-93 and it was below 1. This demonstrated the high shear stability of the comb polymer.

Example 6

In reactor were added:
142.9 g PIB macromonomer from Example 2 (70 wt % solution)
37.5 g 2-Ethylhexyl methacrylate
12.5 g Methyl methacrylate
100.0 g n-Butyl Methacrylate
0.04 g tert-dodecyl mercaptan
123.9 g Synative® ES 2810 (trimethylolpropan ester of fatty acids, KV 40 19.1 mm$^2$/s, KV100 4.4 mm$^2$/s, commercially available from BASF SE)

The monomers % by weight were: 40 wt % PIB macromonomer, 15 wt % EHMA, 5 wt % MMA, 40 wt % NBMA. The monomers were polymerized as described in Example 3. At the end Synative® ES 2810 was added to bring the total polymer content to approx. 30%.

The molecular weight was determined by GPC with polystyrol calibration: 152,000 Mn g/mol, 378,000 Mw g/mol.

The application test results were as follows:
KV100: 650 mm$^2$/s (30 wt % polymer solution)
KV100: 6.88 mm$^2$/s (5 wt % in Chevron® 150R)
KV40: 31.7 mm$^2$/s (5 wt % in Chevron® 150R)
VI: 186

The shear stability was determined by 30 cycles Bosch diesel injector pump according to CEC L-14-93 and it was below 1. This demonstrated the high shear stability of the comb polymer.

Example 7

In reactor were added:
142.9 g PIB macromonomer from Example 2 (70 wt % solution)
37.5 g 2-Ethylhexyl methacrylate
12.5 g Methyl methacrylate
100.0 g n-Butyl Methacrylate
0.04 g tert-dodecyl mercaptan
123.9 g Yubase® 4 (hydrotreated heavy paraffinic mineral oil, CAS 64742-54-7, from SK Lubricants, Korea)

The monomers % by weight were: 40 wt % PIB macromonomer, 15 wt % EHMA, 5 wt % MMA, 40 wt % NBMA. The monomers were polymerized as described in Example 3. At the end Yubase® 4 was added to bring the total polymer content to approx. 30%.

The molecular weight was determined by GPC with polystyrol calibration: 153,000 Mn g/mol, 371,000 Mw g/mol.

The application test results were as follows:
KV100: 677 mm$^2$/s (30 wt % polymer solution)
KV100: 6.81 mm$^2$/s (5 wt % in Chevron® 150R)
KV40: 32.5 mm$^2$/s (5 wt % in Chevron® 150R)
VI: 175

The shear stability was determined by 30 cycles Bosch diesel injector pump according to CEC L-14-93 and it was below 1. This demonstrated the high shear stability of the comb polymer.

The invention claimed is:

1. A comb copolymer comprising in polymerized form
(A) a PIB macromonomer of the formula (I)

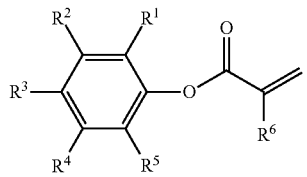

where
R$^1$ to R$^5$ are selected independently from each other from the group comprising hydrogen, C$_1$-C$_{20}$-alkyl, C$_1$-C$_{20}$-alkyloxy, C$_8$-C$_{7500}$-polyisobutyl and C$_8$-C$_{7500}$-polyisobutenyl, where at least one of R$^1$ to R$^5$ is a C$_8$-C$_{7500}$-polyisobutyl or C$_8$-C$_{7500}$-polyiso-butenyl group, and
R$^6$ is hydrogen or methyl, and
(B) an acrylate monomer of the formula (II)

where
R$^7$ is hydrogen or methyl, and R$^8$ is a C$_{1-36}$ alkyl.

2. The comb copolymer according to claim 1 where one of R$^1$ to R$^5$ is a C$_8$-C$_{7500}$-polyisobutyl or C$_8$-C$_{7500}$-polyiso-butenyl group.

3. The comb copolymer according to claim 1 where R$^3$ is a C$_8$-C$_{7500}$-polyisobutyl or C$_8$-C$_{7500}$-polyisobutenyl group.

4. The comb copolymer according to claim 1 where the moieties R$^1$ to R$^5$ which are not C$_8$-C$_{7500}$-polyisobutyl or C$_8$-C$_{7500}$-polyiso-butenyl groups are selected from the group of hydrogen, methyl or tert.-butyl.

5. The comb copolymer according to claim 1 where the acrylate monomer comprises a hydrophobic acrylate monomer of the formula (IIa)

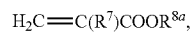

where
R$^7$ is hydrogen or methyl, and R$^{8a}$ is C$_{5-36}$ alkyl, and an hydrophilic acrylate monomer of the formula (IIb)

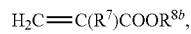

where
R$^7$ is hydrogen or methyl, and R$^{8b}$ is C$_{1-4}$ alkyl.

6. The comb copolymer according to claim 1 comprising 5-60 wt % of the PIB macromonomer.

7. The comb copolymer according to claim 1 comprising 25-90 wt % of the acrylate monomer.

8. The comb copolymer according to claim 5 comprising up to 75 wt % of the hydrophobic acrylate monomer and at least 5 wt % of the hydrophilic acrylate monomer.

9. The comb copolymer according to claim 5 comprising
5-55 wt % PIB macromonomer,
10-85 wt % hydrophobic acrylate monomer, and
1-50 wt % hydrophilic acrylate monomer,
where the sum of all monomers is 100 wt %.

10. A method of preparing the PIB macromonomer of the formula (I)

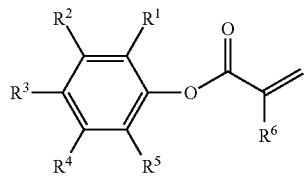

where
R$^1$ to R$^5$ are selected—independently from each other—from the group comprising hydrogen, C$_1$-C$_{20}$-alkyl, C$_1$-C$_{20}$-alkyloxy und C$_8$-C$_{7500}$-polyisobutyl und C$_8$-C$_{7500}$-polyisobutenyl, where at least one of R$^1$ to R$^5$ is a C$_8$-C$_{7500}$-polyisobutyl or C$_8$-C$_{7500}$-polyiso-butenyl group, and
R$^6$ is hydrogen or methyl,
where
a polyisobutene phenol of the formula (III)

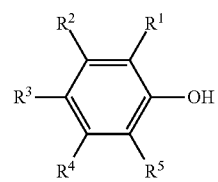

is reacted with (meth)acrylic acid anhydride.

11. The method according to claim 10 where the (meth)acrylic acid anhydride is present in a molar excess in relation to the polyisobutene phenol.

12. The method according to claim 10 where the reaction is followed by hydrolysis of the remaining (meth)acrylic acid anhydride to form (meth)acrylic acid.

13. The method according to claim 12 where the (meth)acrylic acid is removed by distillation or by extraction with water.

14. A lubricant comprising
(i) a base oil,
(ii the comb copolymer according to claim 1, and
(iii) further lubricant additives.

15. A method comprising providing the comb copolymer according to claim 1, including the comb copolymer in a lubricating oil, and improving the viscosity index of the lubricating oil.

* * * * *